United States Patent
Plamondon et al.

(10) Patent No.: US 12,166,321 B2
(45) Date of Patent: Dec. 10, 2024

(54) PATCH PANEL ASSEMBLY

(71) Applicant: BELDEN CANADA ULC, Saint-Laurent (CA)

(72) Inventors: Jean-Sebastien Plamondon, Laval (CA); Nicolai Hjalte Vester, Sabro (DK); Rene Klosterskov, Bjerringbro (DK)

(73) Assignee: BELDEN CANADA ULC, Saint-Laurent (CA)

( * ) Notice: Subject to any disclaimer, the term of this patent is extended or adjusted under 35 U.S.C. 154(b) by 0 days.

(21) Appl. No.: 17/678,870

(22) Filed: Feb. 23, 2022

(65) Prior Publication Data

US 2022/0271483 A1    Aug. 25, 2022

Related U.S. Application Data

(60) Provisional application No. 63/152,951, filed on Feb. 24, 2021.

(51) Int. Cl.

| | |
|---|---|
| *H01R 25/00* | (2006.01) |
| *H01R 13/46* | (2006.01) |
| *H01R 13/518* | (2006.01) |
| *H01R 24/64* | (2011.01) |
| *H04Q 1/02* | (2006.01) |

(52) U.S. Cl.
CPC ......... *H01R 25/006* (2013.01); *H01R 13/465* (2013.01); *H01R 13/518* (2013.01); *H04Q 1/131* (2013.01); *H01R 24/64* (2013.01); *H01R 2201/04* (2013.01); *H04Q 1/13* (2013.01)

(58) Field of Classification Search
CPC .... H01R 25/006; H01R 24/64; H01R 13/465; H01R 13/518; H01R 2201/04; H04Q 1/13
See application file for complete search history.

(56) References Cited

U.S. PATENT DOCUMENTS

| | | | |
|---|---|---|---|
| 7,033,210 B1 * | 4/2006 | Laurer ............... | H01R 13/6587 439/541.5 |
| 7,094,095 B1 * | 8/2006 | Caveney ................ | H04Q 1/13 439/540.1 |
| 7,112,090 B2 * | 9/2006 | Caveney ................ | H04Q 1/09 439/540.1 |
| 7,806,721 B2 * | 10/2010 | Herndon .............. | H01R 13/745 439/540.1 |
| 8,075,344 B2 * | 12/2011 | Shih ........................ | H04Q 1/13 439/649 |
| 8,382,515 B2 | 2/2013 | Caveney et al. | |
| 8,457,582 B2 | 6/2013 | Yamamoto et al. | |
| 8,544,892 B2 | 10/2013 | McNutt et al. | |
| 8,585,437 B2 * | 11/2013 | Lin ...................... | H01R 13/518 439/540.1 |
| 8,840,426 B2 * | 9/2014 | Pepe ..................... | H01R 13/40 439/676 |
| 9,832,542 B2 * | 11/2017 | Carreras Garcia ...... | H04Q 1/13 |

* cited by examiner

*Primary Examiner* — Briggitte R. Hammond
(74) *Attorney, Agent, or Firm* — MH2 Technology Law Group LLP

(57) ABSTRACT

A patch panel assembly, bezel and modular jacks are disclosed which allow modular jacks to be positioned closer together to increase patch panel density. In particular the modular jacks are equipped with features which engage openings which are offset, allowing for the modular jacks to be positioned closer together, in particular when arranged in adjacent parallel rows.

15 Claims, 6 Drawing Sheets

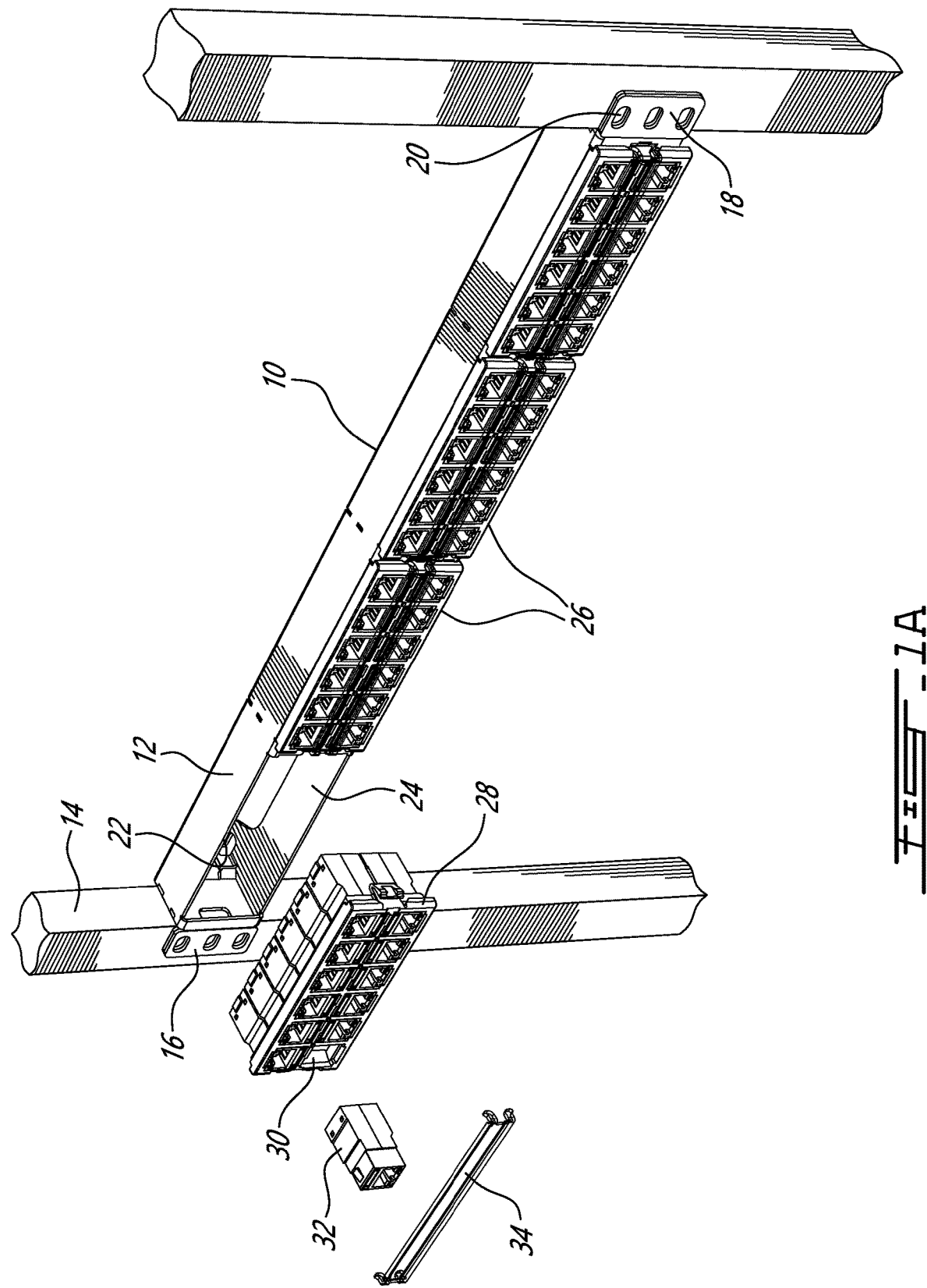

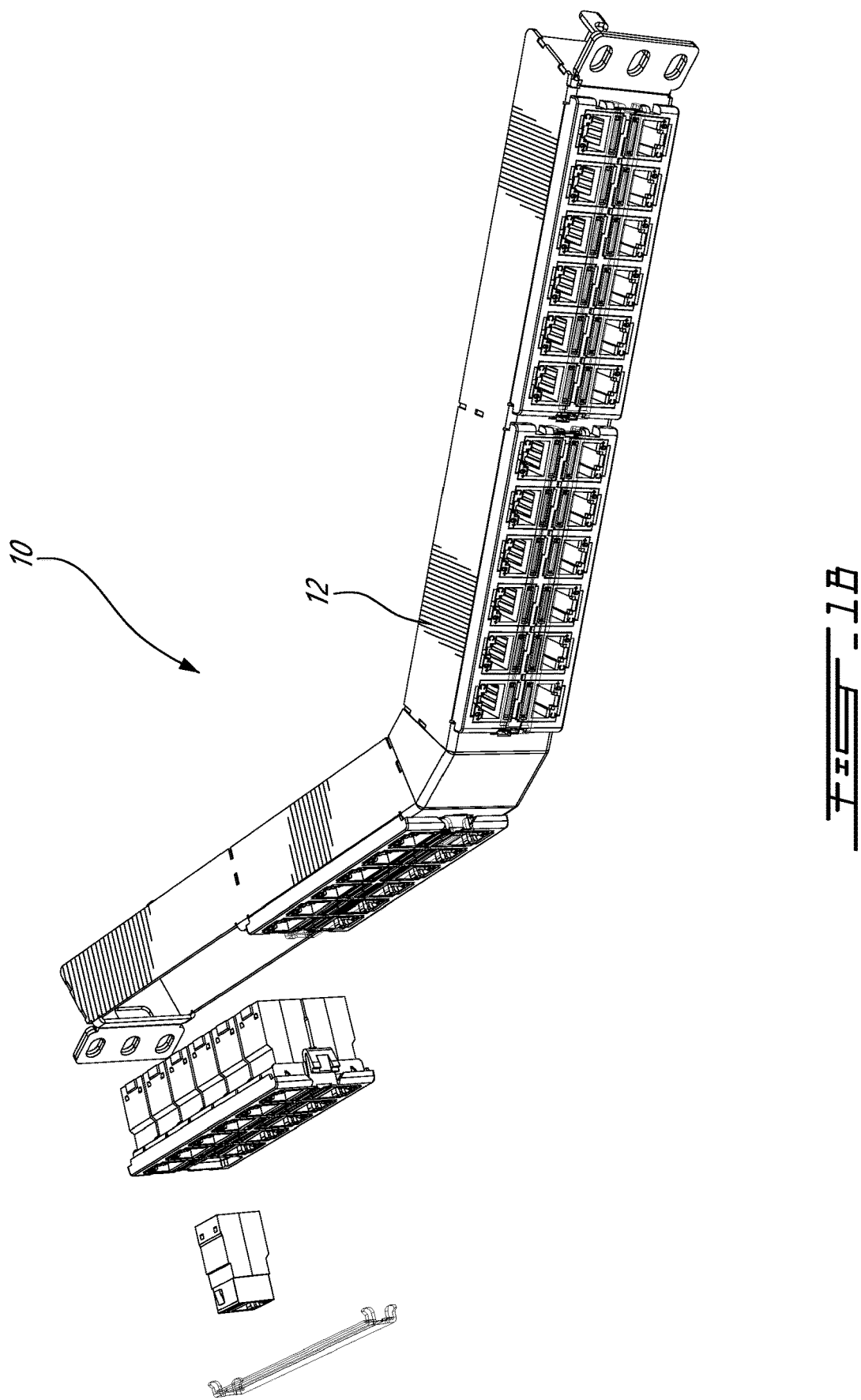

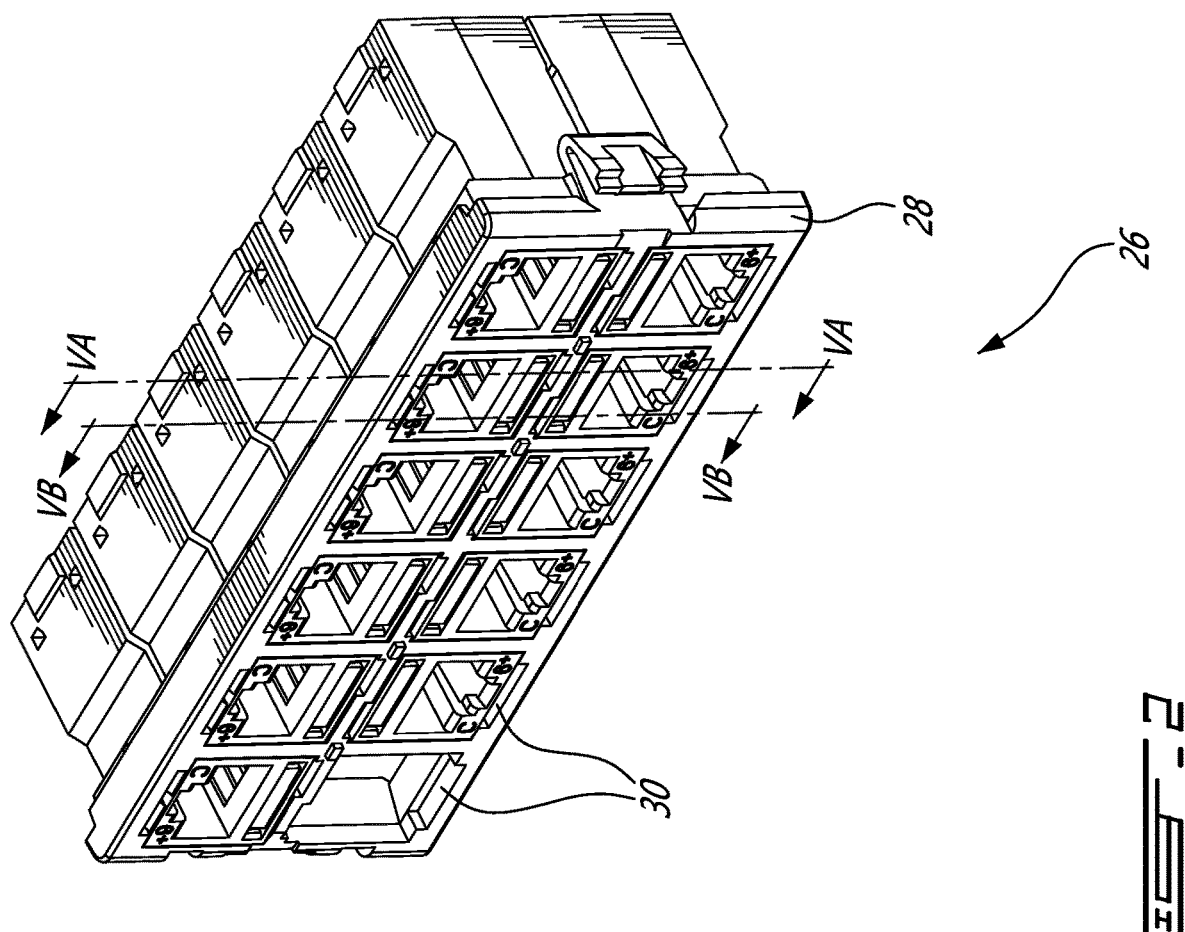
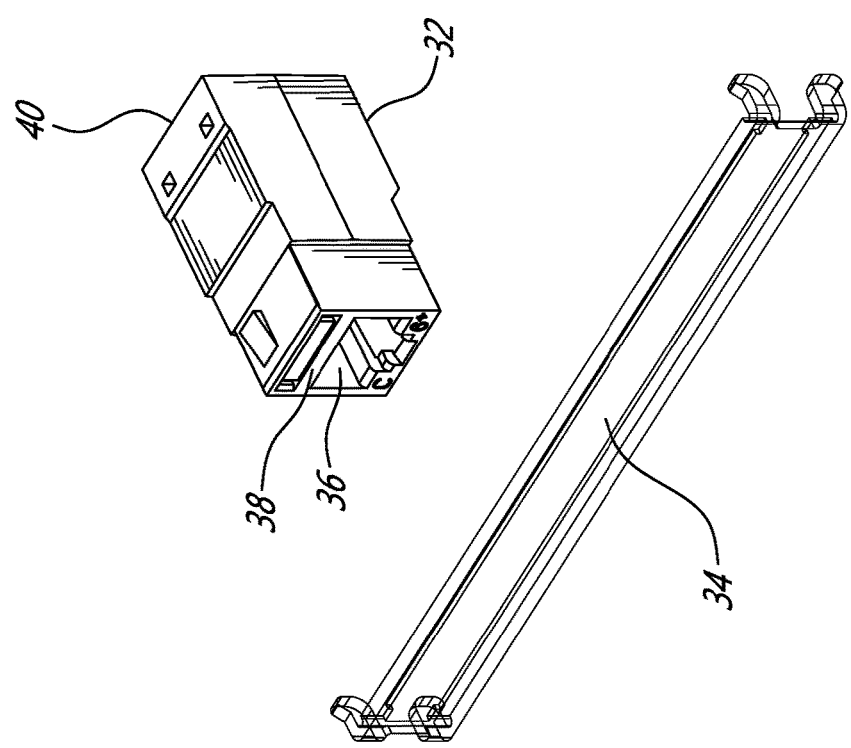
FIG. 2

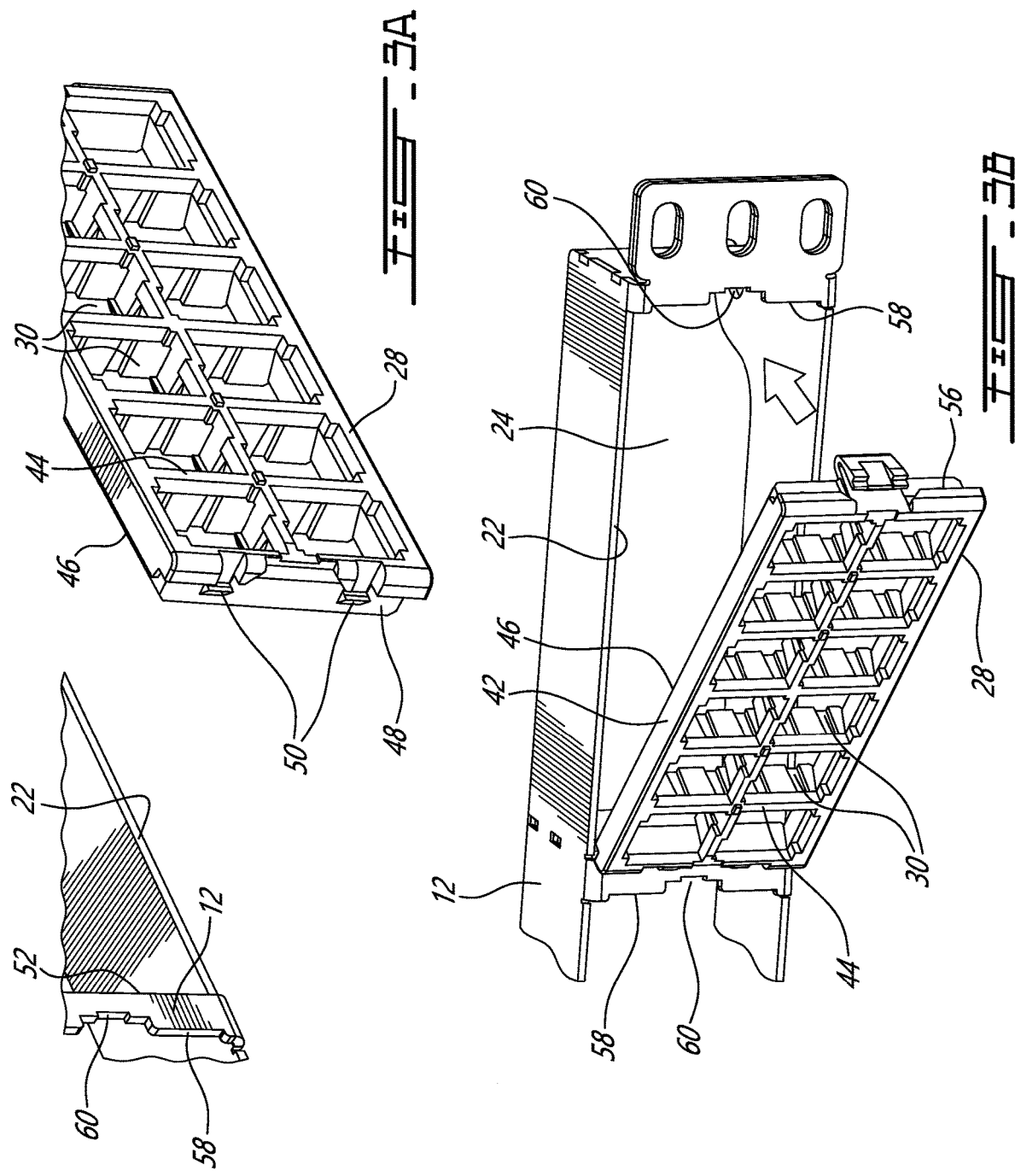

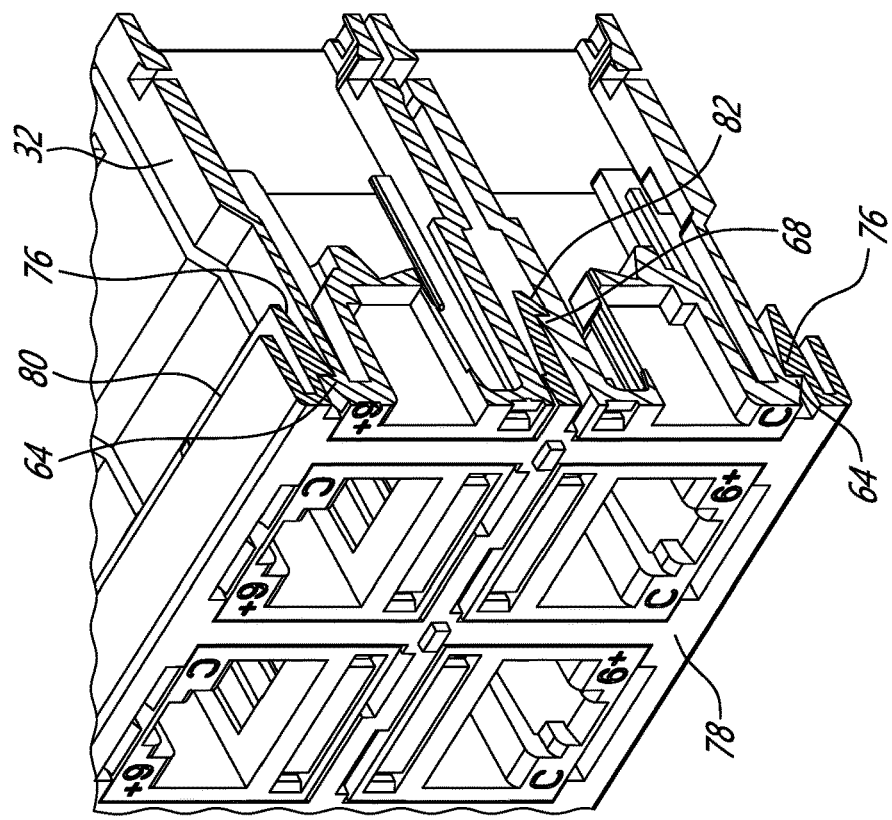
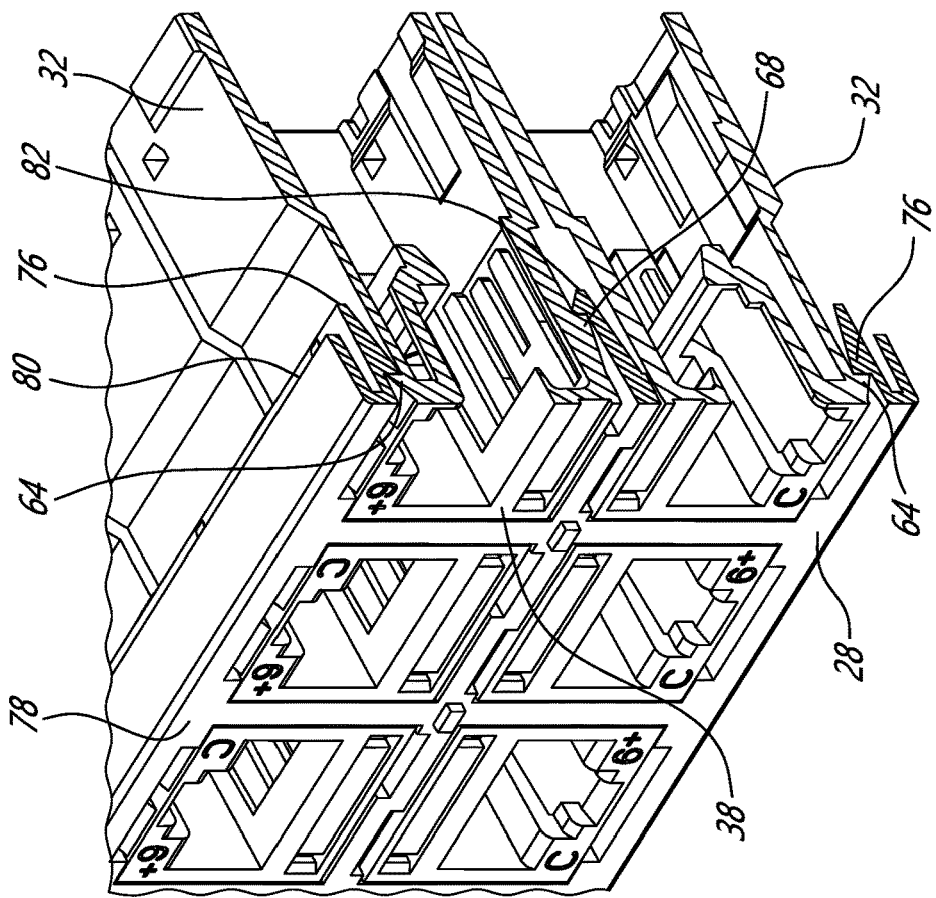

PATCH PANEL ASSEMBLY

CROSS REFERENCE TO RELATED APPLICATIONS

This application claims benefit, under 35 U.S.C. § 119(e) of U.S. provisional application Ser. No. 63/152,951 filed on Feb. 24, 2021 and which is incorporated herein in its entirety by reference.

FIELD OF THE INVENTION

The present invention relates to a patch panel assembly.

BACKGROUND TO THE INVENTION

The prior discloses patch panels for terminating twisted pair cables, for example for use in a wiring closet or in a rack to which networking equipment is mounted in a data center or the like. One drawback of such prior art patch panels, especially when used in data centers, is that rack space is at a premium and the number of twisted pair cables which can be terminated in a given amount of rack space, measured in "U"'s, is limited. Additionally, increasing the density of terminations in a given U of rack space leads to a reduced proximity between receptacles and such that inserting plugs into receptacles and especially reaching and actuating a release tab on the plug of a cable terminated at a given receptacle is rendered more difficult given the limited space between adjacent plugs.

SUMMARY OF THE INVENTION

In order to address the above and other drawbacks there is provided a patch panel assembly for attachment to a rack. The assembly comprises an elongate rectangular panel comprising a flat front face and a flange at each end thereof for securing the panel to the rack, an even first plurality of like generally square openings wherein the openings are arranged in first and second parallel rows along the front face wherein each opening of the first row is arranged adjacent and aligned with a respective one of the openings in the second row, and a plurality of like modular jacks of generally square cross section, each of the jacks dimensioned for being received within one of the generally square openings, each of the jacks comprising a housing of generally square cross section comprising a front face dimensioned to fit snugly within a respective one of the openings and comprising a plug receiving receptacle therein, and a first surface, a second surface opposite the first surface and wherein the first and second surfaces extend between a pair of opposed side surfaces, each of the first, second and side surfaces extending away at right angles from a respective edge of the front face, the housing further comprising an opening engaging feature on the first surface wherein the opening engaging feature is positioned on a first side of a center of the first surface, wherein a first plurality of the modular jacks are received in respective ones of the first row of the openings in a first orientation and a second plurality of the modular jacks are received in respective ones of the second row of the openings in a second orientation at 180 degrees to the first orientation and such that the first surface of each of the first plurality of modular jacks are arranged facing and adjacent the first surface of a respective one of the second plurality of modular jacks.

There is also provided a bezel for mounting in a patch panel comprising an elongate rectangular panel comprising a front face and a plurality of like rectangular spaces arranged along the front face side by side. The bezel comprises a rectangular frame configured to fit snugly within a respective one of the rectangular spaces, a front surface spanning the frame and defining an even plurality of like generally square openings wherein the openings are arranged in first and second parallel rows along the front surface and wherein each opening of the first row is arranged adjacent and aligned with a respective one of the openings in the second row, a pair of flexible fingers arranged side-by-side between each opening of the first row of openings and an adjacent opening of each of the second row of openings and wherein, for a given first opening, a first of the flexible fingers is engageable with an opening engaging feature on a modular jack when positioned in the given first opening and, for a given second opening, a second of the fingers is engageable with an opening engaging feature on a modular jack when positioned in the given second opening, and a mechanism for releasable securing the bezel within its respective rectangular opening.

Also, there is provided a modular jack for mounting in a keystone type opening for receiving a plug terminating a telecommunications cable. The jack comprises a housing of generally square cross section comprising a front face dimensioned to fit snugly within the keystone type opening and a first surface, a second surface opposite the first surface, the first and second surfaces extending between a pair of opposed side surfaces, each of the surfaces extending away at right angles from a respective edge of the front face, a receptacle in the front face configured for receiving the plug, a first opening engaging feature on the first surface, and a second opening engaging feature on the second surface. The first opening engaging feature is positioned on a first side of a center of the first surface and a second side of a center of the first surface is free of an opening engaging feature.

BRIEF DESCRIPTION OF THE DRAWINGS

FIG. 1A provides a raised right perspective view of a patch panel assembly in accordance with an illustrative embodiment of the present invention;

FIG. 1B provides a raised right perspective view of a patch panel assembly in accordance with an alternative illustrative embodiment of the present invention;

FIG. 2 provides a raised right exploded perspective view of a receptacle module in accordance with an illustrative embodiment of the present invention;

FIGS. 3A and 3B provide detailed views of a bezel and panel in accordance with an illustrative embodiment of the present invention;

FIGS. 5A and 5B provide sectional views respectively along lines VA-VA and VB-VB in FIG. 2.

DETAILED DESCRIPTION OF THE ILLUSTRATIVE EMBODIMENTS

Figure 4B:
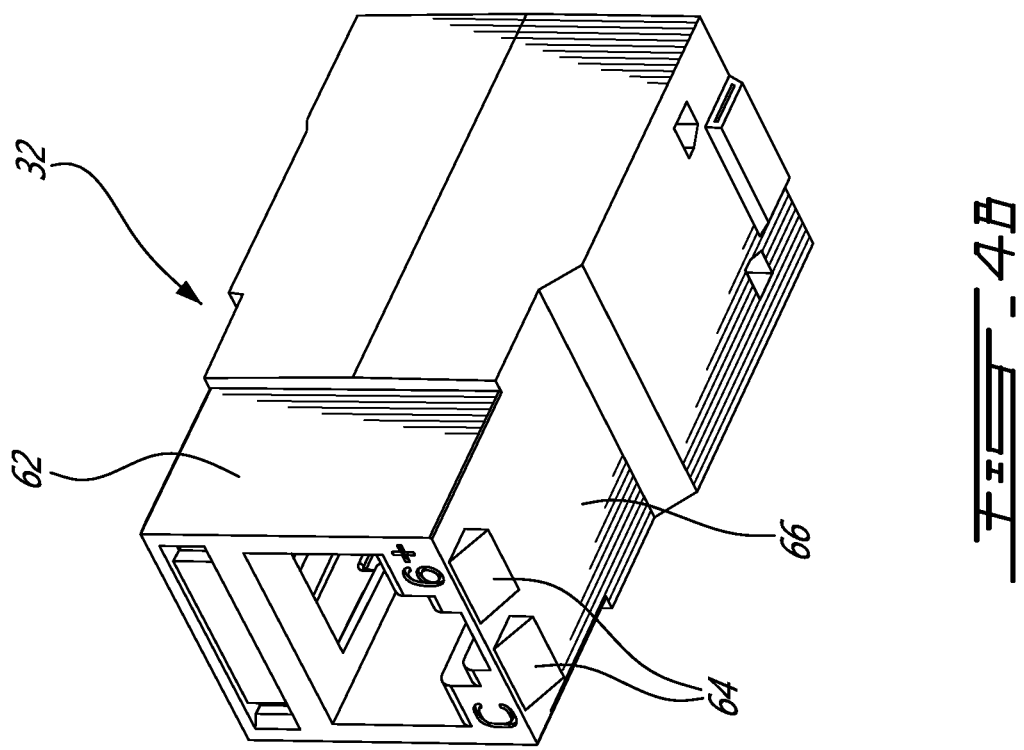
FIGS. 4A and 4B provide respectively a raised right front perspective view and a lowered right front perspective view of a keystone modular jacks in accordance with an illustrative embodiment of the present invention.

Referring now to FIG. 1A, a patch panel assembly, generally referred to using the reference numeral 10, will now be described. The patch panel assembly 10 comprises an elongate rectangular panel 12 which is configured for secure mounting to a 19" rack 14 or the like, for example through provision of a mounting bracket/flange 16, 18 at either end thereof and comprising apertures 20 through which threaded bolts (not shown) can be inserted and engaged by respective threaded bores (also not shown) in the rack 14. The panel 12 is illustratively of 1 U rack height and comprises a substantially flat front face 22 defining a plurality of rectangular openings/spaces 24 arranged along the front face side by side and which are each dimensioned to receive a respective one of a plurality of receptacle modules 26.

Referring to FIG. 1B, in an alternative embodiment the panel 12 can be angled comprising two elongate sections arranged at an angle to one another and interconnected by a middle section. Each elongate section comprises two rectangular openings.

Referring to FIG. 2 in addition to FIG. 1A, each receptacle module 26 comprises a rectangular bezel 28 which defines an even plurality of generally square modular jack openings 30, and such that each bezel 28 is configured for receiving a plurality of rows of modular keystone type modular jacks 32 wherein each of the openings 30 in a first of the rows is arranged adjacent and aligned with a respective opening 30 in a second of the rows. Illustratively two (2) rows of six (6) modular jacks 32 each are provided for a total of twelve (12) modular jacks 32 in each bezel 28. Additionally, a transparent cover plate/label holder 34 is provided which may receive a printed insert (not shown) for identifying each of the modular jacks 3.

Still referring to FIG. 2, each modular jack 32 comprises an RJ-45 type socket 36 on a front face 38 thereof configured for receiving a first eight (8) conductor twisted pair cable terminated by a standard RJ-45 plug (not shown). Each modular jack 32 is further configured for terminating a second eight (8) conductor twisted pair cable (also not shown) on a rear face 40 thereof.

Referring now to FIGS. 3A and 3B, each bezel 28 comprises a frame 42 and a front surface 44 spanning the frame 42 and which defines the openings 30. The frame is dimensioned to fit snugly in the respective rectangular space 24 while the front surface 44 is slightly larger than the rectangular space 24 such that on installation an outer edge 46 of the front surface butts against the front face 22. A first short edge 48 of the frame 42 comprises features 50 which on installation receive a respective short edge 52 of the rectangular space 24. A user actuatable latch 54 is also provided on a second short edge 56 of the frame 42 which, on installation, engages with a second short edge 58 of the rectangular space 24 for releasably securing a bezel 28 within its respective rectangular opening 24 in the frame 12. In this regard, each second short edge 58 comprises a notch 60 which is dimensioned for receiving the latch 48.

Figure 4A:
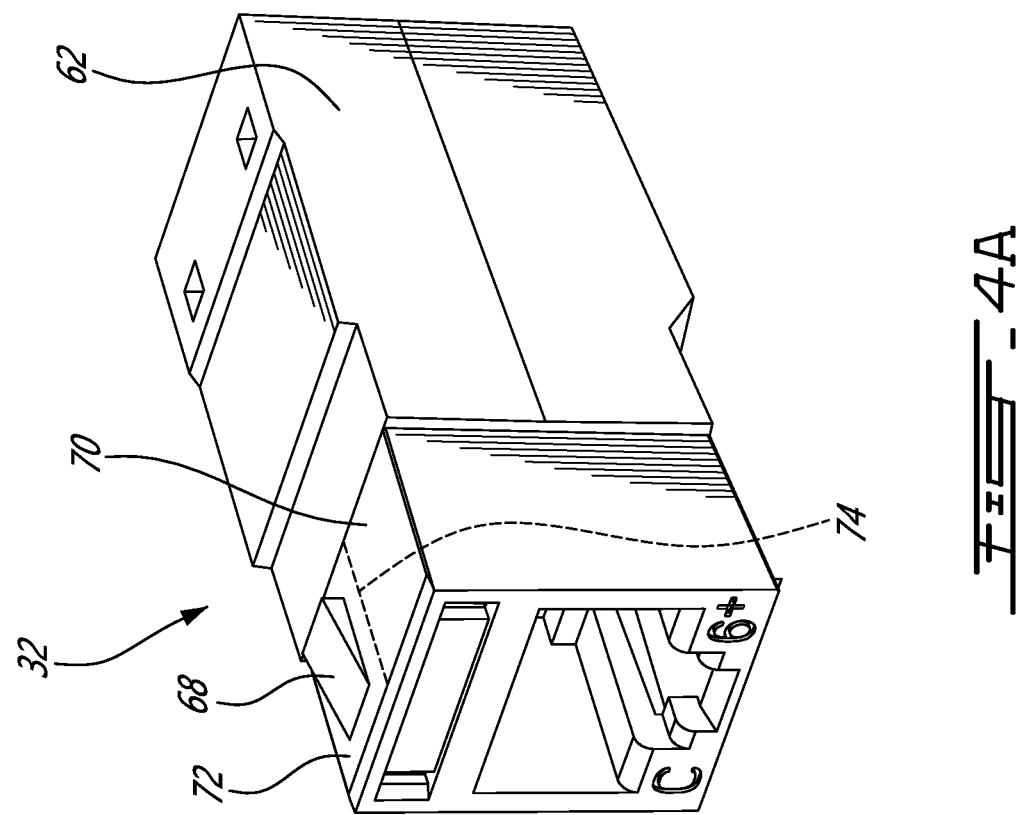

Referring now to FIGS. 4A and 4B, each modular jack 32 comprises a housing 62 of generally square cross section which is dimensioned to be compatible with, for example, keystone wall plates (not shown). As known in the art, such wall plates comprise one or more keystone ports, that is a hole in the wall plate which allows the insertion of a keystone type modular receptacle or a variety of other male or female cabling connectors. Each of the modular jacks 32 comprises a pair of tabs 64 on a first side 66 thereof and a first bezel engaging feature comprising an offset tab 68 on a second side 70 thereof. In other words, the first bezel engaging feature is positioned on a first side 72 of a center 74 of a surface of the second side 70.

Referring now to FIGS. 5A and 5B in addition to FIGS. 4A and 4B, each bezel 28 comprises a pair of engagement plates 76 each arranged adjacent and in parallel to a respective long edge of the bezel 28 and extending rearwards from a front surface 78 of the bezel 28. The modular jacks 32 are inserted into the bezel 28 from the rearward side 80 of the bezel 28 by tilting the modular jack 32 to first engage the pair of tabs 62 with their respective engagement plate 76. The modular jack 32 is then straightened such that the offset tab 68 engages with a respective one of a plurality of offset flexible fingers 82 also extending rearwards from a front surface 78 of the bezel 28 and the front face 38 of the modular jack 32 is flush with the front surface 78 of the bezel 26. In this regard, the flexible fingers 82 of openings 30 receiving opposed/adjacent ones of the modular jacks 32 are arranged side by side and such that they can be flexed without interfering with one another and without being impeded by an opposed one of the modular jacks 32 already positioned within its opening 30. As will now be understood by a person of ordinary skill in the art, provision of the offset tabs 68 and the offset flexible fingers 82 as well as positioning pairs of modular jacks 32 in an opposed configuration and such that the orientation of the modular jacks 32 in a first of the rows is 180 degrees to the orientation of the modular jacks 32 in a second of the rows with their respective offset tabs 68 facing one another allows the modular jacks 32 to be placed closer together, thereby increasing density. Additionally, orientation of the modular jacks 32 such that the actuating lever of a plug (both not shown) received within the receptacle modular jacks 32 is positioned outwards increases the amount of space provided to a user to disengage a plug from its respective modular jacks 32 thereby facilitating plug removal.

Although the present invention has been described hereinabove by way of specific embodiments thereof, it can be modified, without departing from the spirit and nature of the subject invention as defined in the appended claims.

The invention claimed is:

1. A patch panel assembly for attachment to a rack comprising: an elongate panel comprising a flat front face and a flange at each end thereof for securing the panel to the rack;

an even first plurality of like generally square openings wherein the openings are arranged in first and second parallel rows along the front face wherein each opening of the first row is arranged adjacent and aligned with a respective one of the openings in the second row;

a plurality of like modular jacks of generally square cross section, each of the jacks dimensioned for being received within one of the generally square openings, each of the jacks comprising a housing of generally square cross section comprising a front face dimensioned to fit snugly within a respective one of the openings and comprising a plug receiving receptacle therein, and a first surface, a second surface opposite the first surface and wherein the first and second surfaces extend between a pair of opposed side surfaces, each of the first, second and side surfaces extending away at right angles from a respective edge of the front face, the housing further comprising an opening engaging feature on the first surface wherein the opening engaging feature is positioned on a first side of a center of the first surface;

wherein a first plurality of the modular jacks are received in respective ones of the first row of the openings in a first orientation and a second plurality of the modular jacks are received in respective ones of the second row of the openings in a second orientation at 180 degrees to the first orientation and such that the first surface of each of the first plurality of modular jacks are arranged facing and adjacent the first surface of a respective one of the second plurality of modular jacks;

wherein the elongate rectangular panel further comprises a flat front face comprising a plurality of like rectangular spaces arranged along the front face side by side, the patch panel assembly further comprising a plurality of like rectangular bezels, each of the bezels releasably received in a respective one of the rectangular spaces, each of the bezels together defining the even first plurality of the square openings;

wherein the bezel comprises a front surface spanning the frame and defining an even plurality of like generally square openings wherein the openings are arranged in first and second parallel rows along the front surface and wherein each opening of the first row is arranged adjacent and aligned with a respective one of the openings in the second row; and wherein the bezel comprises and a pair of flexible fingers arranged side-by-side between each opening of the first row of openings and an adjacent opening of each of the second row of openings and wherein, for a given first opening, a first of the flexible fingers is engageable with an opening engaging feature on a first one of the modular jacks when positioned in the given first opening and, for a given second opening, a second of the fingers is engageable with an opening engaging feature on a second of the modular jacks when positioned in the given second opening.

2. The patch panel assembly of claim 1, further comprising at least one cover plate securable between the first and the second parallel rows, the cover plate covering a portion of the front face of each of the modular jacks but not the receptacle.

3. The patch panel assembly of claim 2, wherein the cover plate is transparent and configured for receiving a label.

4. A bezel for mounting in a patch panel comprising an elongate rectangular panel comprising a front face and a plurality of like rectangular spaces arranged along the front face side by side, the bezel comprising:

a rectangular frame configured to fit snugly within a respective one of the rectangular spaces;

a front surface spanning the frame and defining an even plurality of like generally square openings wherein the openings are arranged in first and second parallel rows along the front surface and wherein each opening of the first row is arranged adjacent and aligned with a respective one of the openings in the second row;

a pair of flexible fingers arranged side-by-side between each opening of the first row of openings and an adjacent opening of each of the second row of openings and wherein, for a given first opening, a first of the flexible fingers is engageable with an opening engaging feature on a modular jack when positioned in the given first opening and, for a given second opening, a second of the fingers is engageable with an opening engaging feature on a modular jack when positioned in the given second opening; and a mechanism for releasably securing the rectangular frame within the respective one of the rectangular spaces.

5. The bezel of claim 4, wherein the front surface is larger than the respective rectangular space and further wherein an outer edge of the front surface butts against the front face.

6. The bezel of claim 4, wherein the mechanism comprises features on a first short edge of the rectangular frame for receiving a first short edge of the rectangular opening and a flexible tab on a second short edge of the rectangular frame for releasably engaging a notch in a second short edge of the rectangular space and further wherein the bezel is secured within the rectangular space by, following receiving the first short edge of the rectangular space in the features, pivoting the bezel about the first short edge of the rectangular space until the flexible tab engages the notch.

7. A modular jack for mounting in a keystone type opening for receiving a plug terminating a telecommunications cable, the modular jack comprising:

a housing of generally square cross section comprising a front face defining a symmetrical front opening and dimensioned to fit snugly within the keystone type opening and a first surface, a second surface opposite the first surface, the first and second surfaces extending between a pair of opposed side surfaces, each of the surfaces extending away at right angles from a respective edge of the front face, wherein the opposed side surfaces are each on a respective side of an axis of symmetry of the symmetrical front opening;

a receptacle in the front face configured for receiving the plug via the symmetrical front opening;

a first opening engaging feature on the first surface;

a second opening engaging feature on the second surface;

wherein the first opening engaging feature is positioned on a first side of a center of the first surface and a second side of a center of the first surface is free of an opening engaging feature; and wherein the second opening engaging feature is positioned on both sides of a center of the second surface.

8. The modular jack of claim 7, wherein the receptacle is configured for receiving a RJ-45 type plug.

9. The modular jack of claim 7, wherein the plug comprises a flexible lever for engaging the plug and the receptacle and wherein the receptacle is configured such that when the plug is inserted into the receptacle, the flexible lever is positioned adjacent the second surface.

10. The patch panel assembly of claim 1, wherein the elongate panel is of 1U rack height.

11. The patch panel assembly of claim 1, wherein the elongate panel comprises two elongate sections which are arranged at an angle to one another.

12. The patch panel assembly of claim 11, wherein each of the two elongate sections comprises two (2) rectangular spaces arranged along the front face side by side.

13. The patch panel assembly of claim 11, wherein each of the two elongate sections are separated by a middle section.

14. The patch panel assembly of claim 1, wherein the flat front face comprises four (4) rectangular spaces arranged along the front face side by side.

15. The bezel of claim 4, wherein said front surface defines twelve (12) generally square openings, the first row comprises six (6) openings and the second row comprises six (6) openings.

* * * * *